United States Patent [19]

Ikeuchi et al.

[11] Patent Number: 5,794,150
[45] Date of Patent: Aug. 11, 1998

[54] INTER-ZONE CONNECTION COMMUNICATION METHOD AND SYSTEM

[75] Inventors: Seiko Ikeuchi; Naoki Seki, both of Tokyo, Japan

[73] Assignee: Mitsubishi Denki Kabushiki Kaisha, Tokyo, Japan

[21] Appl. No.: 660,206

[22] Filed: Jun. 3, 1996

[30] Foreign Application Priority Data

Jun. 20, 1995 [JP] Japan ................. 7-153228

[51] Int. Cl.$^6$ ............................ H04B 7/00
[52] U.S. Cl. .................. 455/452; 455/453; 455/464
[58] Field of Search .................. 455/14, 15, 446, 455/450, 464, 449, 451, 452, 453, 455, 436, 444, 443, 509, 514, 422, 528; 370/330, 336, 329, 468

[56] References Cited

U.S. PATENT DOCUMENTS

| 4,127,744 | 11/1978 | Yoshikawa et al. | 455/446 |
|---|---|---|---|
| 4,573,206 | 2/1986 | Grauel et al. | 455/453 |
| 4,792,984 | 12/1988 | Matsuo | 455/452 |
| 5,504,937 | 4/1996 | Kangas | 455/453 |

OTHER PUBLICATIONS

Tokai Mobil Radio Center Foundation, "A Report of Development and Research of the Inter-Zone Connection . . . System", Sep. 1994.

*Primary Examiner*—Edward F. Urban
*Attorney, Agent, or Firm*—Rothwell, Figg, Ernst & Kurz

[57] ABSTRACT

An inter-zone connection communication method for carrying out a general connection communication and an inter-zone connection communication at the same time, using general connection channels which are used for general connection communication between connection stations in a radio communication area of one relay station, and using inter-zone connection channels which are used for inter-zone connection communication between a connection station in a radio communication area of one relay station and another connection station in another relay station, comprising a step of carrying out line control by changing an assignment ratio of the general connection channels to the inter-zone connection channels according to respective traffic quantities of the general connection communication and the inter-zone connection communication. Thereby, traffic processing capability of the system can be improved.

24 Claims, 15 Drawing Sheets

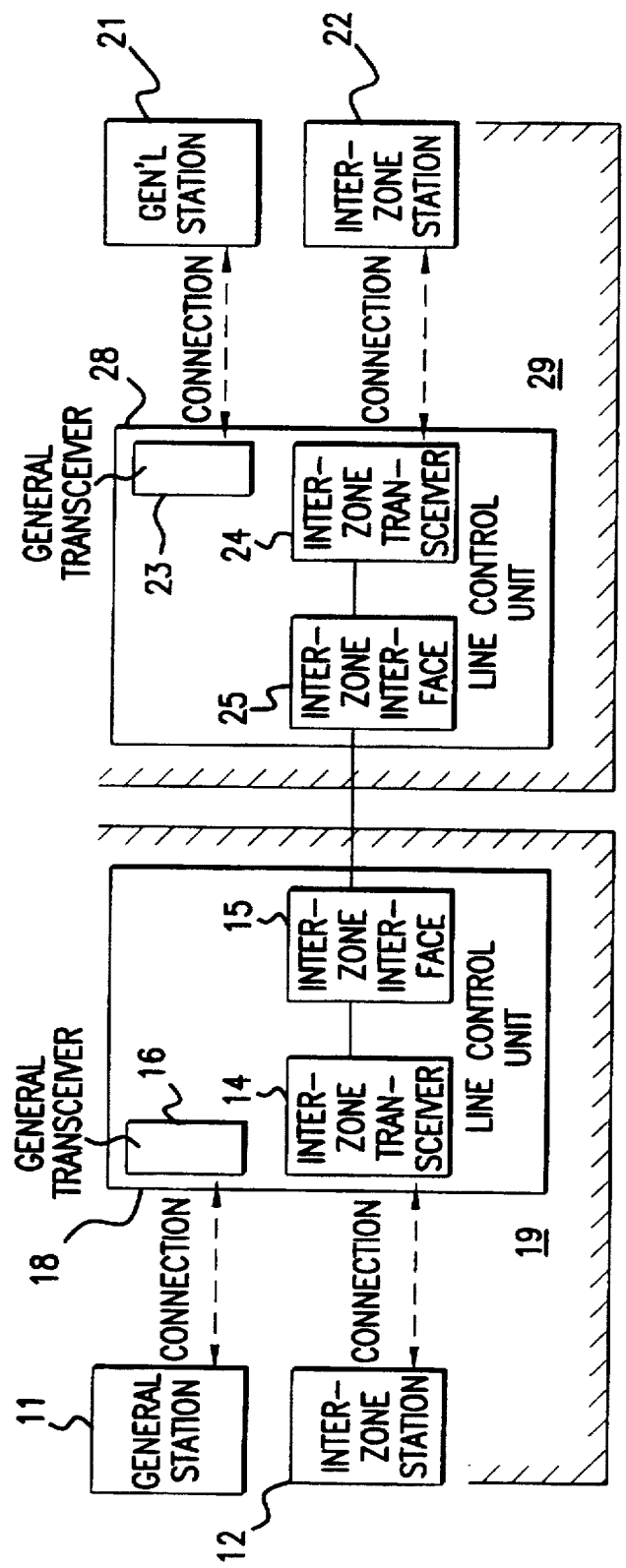
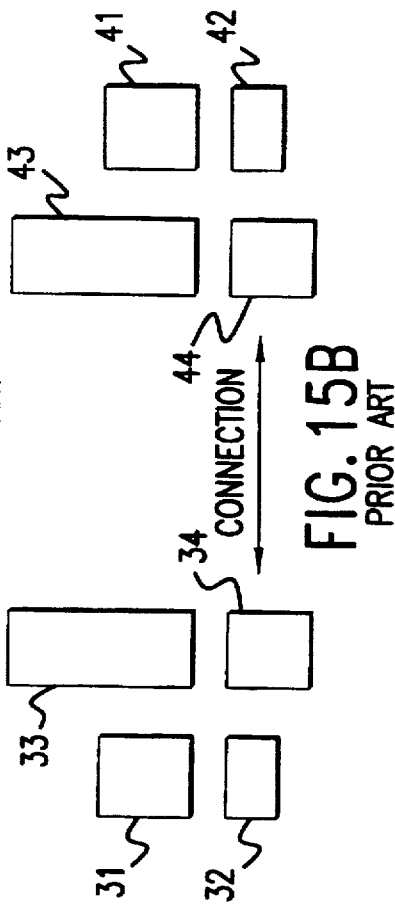
FIG. 15A PRIOR ART
FIG. 15B PRIOR ART

INTER-ZONE CONNECTION COMMUNICATION METHOD AND SYSTEM

BACKGROUND OF THE INVENTION

1. Field of the Invention

This invention relates to an inter-zone connection communication system which, for example, carries out communication connection of intra-zones and inter-zones of a mobile radio communication system.

2. Description of the Prior Art

FIGS. 15A, 15B show block diagrams of a construction of a communication system in a conventional large zone system described in the paper "The Technical Development Report of The inter-zone connection in a MCA System", the Foundation of Tokai Mobile Radio Center, September, 1994. FIG. 15B shows a block diagram of a construction of channels and reservation cues. The communication system comprises a general connection mobile station 11 which is a connection station, an inter-zone connection mobile station 12 which is the other connection station and a line control unit 18. The line control unit 18 is arranged in a relay station and comprises a general connection receiver/transmitter 13, an inter-zone connection receiver/transmitter 14, an inter-zone interface apparatus 15. The communication system further comprises a communication region 19 of this system. The general connection receiver/transmitter 13 comprises a general connection channel 31 and a general connection reservation cue 33. The inter-zone connection receiver/transmitter 14 comprises an inter-zone connection channel 32 and an inter-zone connection reservation cue 34. The number of channels and the number of reservation cues are kept constant.

The communication system in FIG. 15A further comprises a general connection mobile station 21, an inter-zone connection mobile station 22 and a line control unit 28. The line control unit 28 is arranged in the relay station and comprises a general connection receiver/transmitter 23, an inter-zone connection receiver/transmitter 24 and an inter-zone interface apparatus 25. The communication system further comprises a communication region 29 of this system. Further, the general connection receiver/transmitter 23 comprises a general connection channel 41 and a general connection reservation cue 43. The inter-zone connection receiver/transmitter 24 comprises an inter-zone connection channel 42 and an inter-zone connection reservation cue 44. The number of channels and the number of reservation cues are kept constant.

An operation of the system is explained below using FIGS. 15A, 15B. The general connection receiver/transmitter 13 assigns a channel to the general connection mobile station 11, thereby the general connection communication can be carried out separately from the inter-zone connection communication. The inter-zone connection receiver/transmitter 14 assigns a channel to the inter-zone connection mobile station 12, thereby the inter-zone connection is carried out. When arranging this inter-zone connection call, a series of operations are carried out as follows: the inter-zone interface apparatus 15 in the line control unit 18 is connected to the inter-zone interface apparatus 25 in the line control unit 28, and then the inter-zone connection receiver/transmitter 24 assigns a channel to the inter-zone connection mobile station 22. The general connection receiver/transmitter 23 assigns a channel to the general connection mobile station 21, thereby the general connection communication is carried out separately from the inter-zone connection communication. With regard to a channel assignment in the intra-communication region 19, the general connection channel 31 and the inter-zone connection channel 32 are independent from each other. Therefore, channel assignment can be carried out using the general connection channel 31 and the inter-zone connection channel 32. When channels are fully occupied, new requests for connection are held temporarily in the general connection reservation cue 33 and the inter-zone connection reservation cue 34, which are independently equipped. The same operation is also carried out in the line control unit 28.

Since a conventional MCA (Multi-Channel Access) communication system is constructed as described above, a general connection communication and an inter-zone connection communication are assigned to separate channels and reservation cues independently. Therefore, it is difficult to assign calls to empty channels effectively when an imbalance exists between the general connection traffic density and the inter-zone connection traffic density.

It is an object of the present invention to eliminate an inconvenience of the conventional art, and to provide an inter-zone connection communication method for assigning channels and reservation cues which have possibility of a general connection communication and an inter-zone connection communication, according to the traffic density which indicates an index of traffic congestion.

SUMMARY OF THE INVENTION

According to one aspect of the present invention, an inter-zone connection communication method for carrying out a general connection communication and an inter-zone connection communication at the same time using general connection channels which are used for the general connection communication between connection stations in a radio communication area of one relay station, and using inter-zone connection channels which are used for the inter-zone connection communication between a connection station in a radio communication area of one relay station and another connection station in other relay station, comprising a step of carrying out line control by changing an assignment ratio of the general connection channels to the inter-zone connection channels according to respective traffic quantities of the general connection communication and the inter-zone connection communication.

According to another aspect of the invention, an inter-zone connection communication method for carrying out a general connection communication and an inter-zone connection communication at the same time, using general connection channels which are used for the general connection communication between connection stations in a radio communication area of one relay station, and using inter-zone connection channels which are used for the inter-zone connection communication between a connection station in a radio communication area of one relay station and another connection station in other relay station, comprising a step of carrying out line control by changing an assignment ratio of the general connection reservation cues for storing reservation, when the general connection channels are fully occupied, to the inter-zone connection reservation cues for storing reservation, when the inter-zone connection channels are fully occupied, according to respective traffic quantities of the general connection communication and the inter-zone connection communication.

According to further aspect of the invention, an inter-zone connection communication method for carrying out a general connection communication and an inter-zone connection communication at the same time, using general connection channels which are used for the general connection communication between connection stations in a radio communication area of one relay station, and using inter-zone connection channels which are used for the inter-zone connection communication between a connection station in a radio communication area of one relay station and another connection station in other relay station, wherein further using general connection reservation cues for storing reservation when the general connection channels are fully occupied, and inter-zone connection reservation cues for storing reservation when the inter-zone connection channels are fully occupied, and further an assignment ratio of the general connection reservation cues to the inter-zone connection reservation cues, and an assignment ratio of the general connection channels to the inter-zone connection channels are changed at the same time, according to respective traffic quantities of the general connection communication and the inter-zone connection communication.

Preferably, in the inter-zone connection communication method, the respective traffic quantities are traffic densities of the general connection communication and the inter-zone connection communication, respectively.

Preferably, in the inter-zone connection communication method, the respective traffic quantities are reservation quantities of the general connection communication and the inter-zone connection communication, respectively.

Preferably, in the inter-zone connection communication method, more channels of the general connection channels or the inter-zone connection channels are assigned to one of the communication side where a congestion has occurred between the general connection communication and the inter-zone connection communication.

BRIEF DESCRIPTION OF THE DRAWINGS

FIGS. 15A, 15B show conventional block diagrams of the inter-zone connection communication system.

DETAILED DESCRIPTION OF THE PREFERRED EMBODIMENTS

Embodiment 1

Figure 1A:
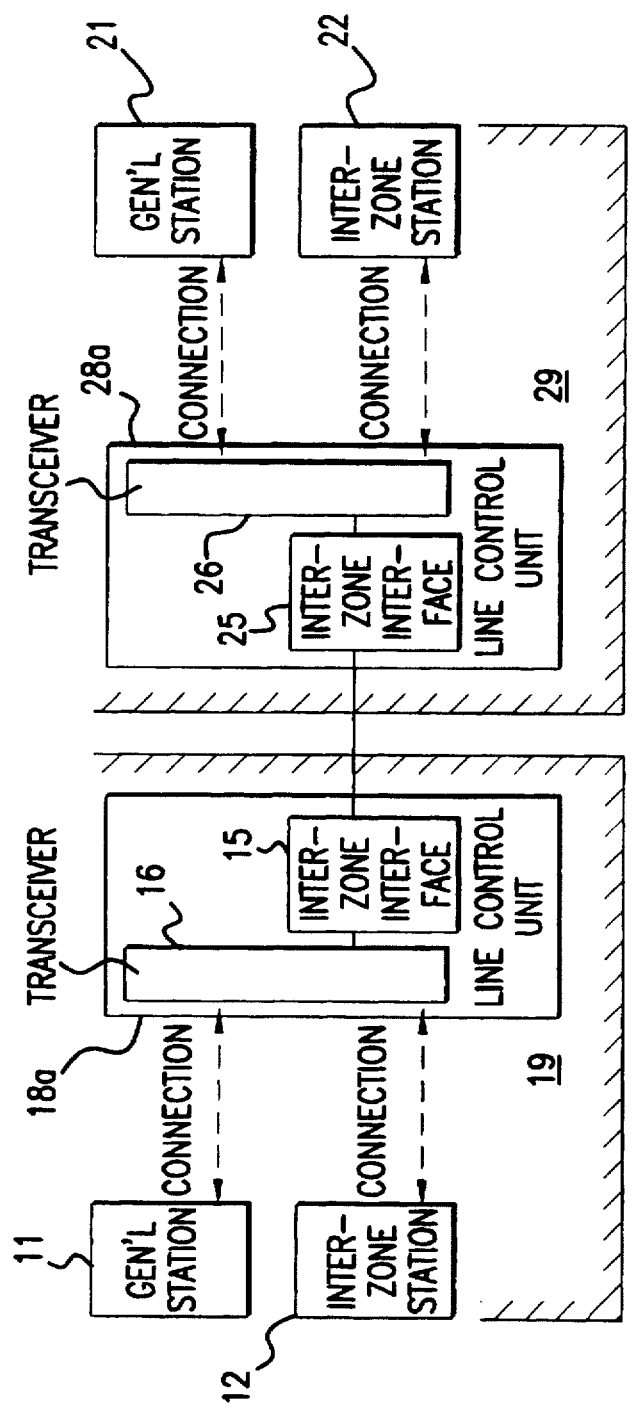
FIGS. 1A, 1B show block diagrams of an inter-zone connection communication system according to a first embodiment of the present invention.
Figure 1B:
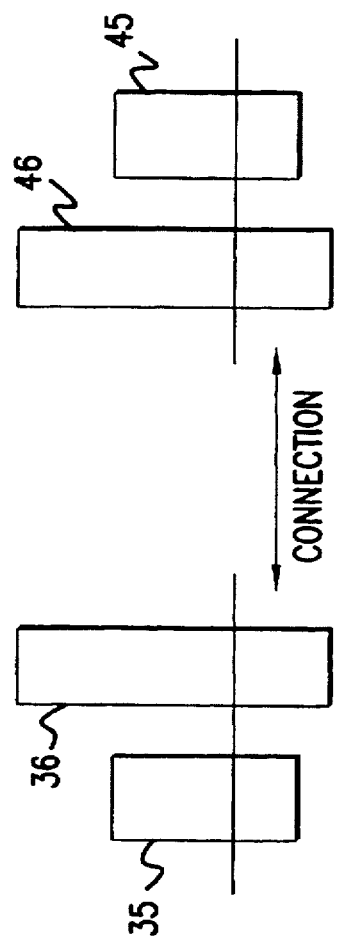

A first embodiment of the present invention is explained below using figures. FIGS. 1A, 1B are block diagrams which show a construction of an inter-zone connection communication system of the present invention. FIG. 1A shows a hardware construction, and FIG. 1B shows a construction of channels and reservation cues. The reference numbers in FIGS. 1A, 1B are the same as those used in FIGS. 15A, 15B for the same portions or the corresponding portions. In FIGS. 1A, 1B, a receiver/transmitter 16 in the line control unit 18a is used commonly for the general connection and the inter-zone connection. A common channel 35 is used commonly for the general connection channel and the inter-zone connection channel, and a reservation cue 36 is used commonly for the general connection and the inter-zone connection. In the general connection communication or the inter-zone connection communication, assignment can be changed flexibly in both the common channel 35 and the common reservation cue 36. A receiver/transmitter 26 in the line control unit 28a is used commonly for the general connection and the inter-zone connection. A common channel 45 is used commonly for the general connection and the inter-zone connection, and a reservation cue 46 is used commonly for the general connection and the inter-zone connection. In the general connection communication or the inter-zone connection communication, the assignment of both the channel 45 and the reservation cue 46 can be changed flexibly.

An operation is explained below using FIGS. 1A, 1B. The line control units 18a and 28a assign channels and reservation cues to the receivers/transmitters 16 and 26 used for the general connection and inter-connection in common. A system for determining the assignment ratio for assigning the general connection channel and inter-zone channel to the general connection and the inter-zone connection common channels 35, 45 (referred to as operation channels hereinafter) in the receivers/transmitters 16 and 26, respectively, is explained using FIG. 2. Here, the communication region 19 is explained as an example of the system.

Figure 2:
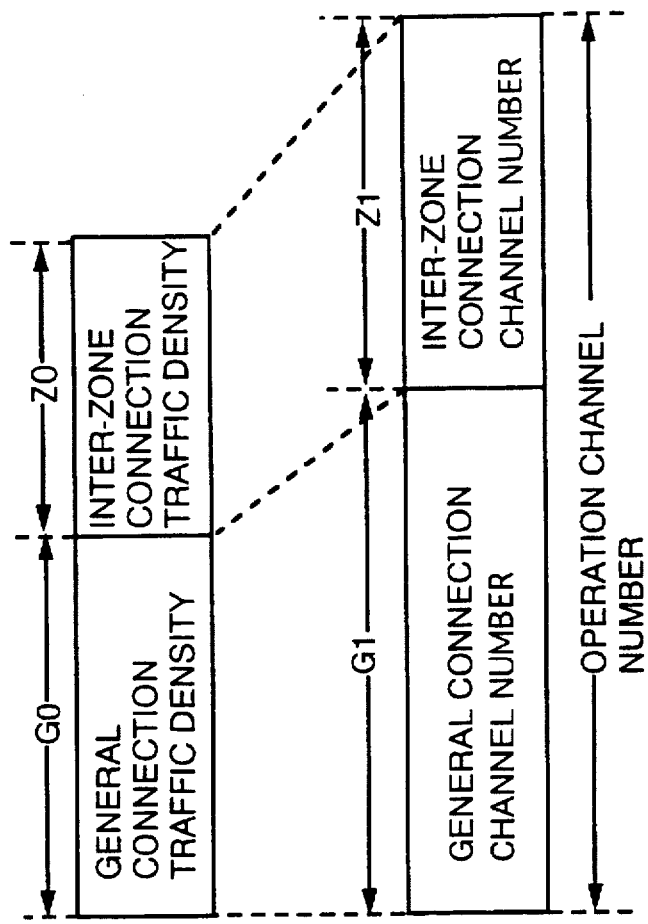
FIG. 2 shows an assignment condition of operation channels in an inter-zone connection communication system according to the first embodiment of the present invention.

FIG. 2 explains an assignment condition of operating channels in an inter-zone connection communication system of a first embodiment. In FIG. 2, the numeral G0 denotes a general connection traffic density according to a plurality of the general connection mobile stations 11. The numeral Z0 denotes an inter-zone connection traffic density according to a plurality of the inter-zone connection mobile stations 12. G1 denotes the number of the general connection channels to which the operation channel 35 is assigned. Z1 denotes the number of the inter-zone connection channels to which the operation channel 35 is assigned.

The ratio of the general connection traffic density G0 to the inter-zone connection traffic density Z0 usually varies according to the operation time zone. The line control units 18 and 28 change the number of the general connection channels and the inter-zone connection channels according to the ratio of the traffic density generated inside its own zone by following formulas.

The number of channels is set according to the following equation.

---

General connection traffic density G0: inter-zone connection traffic density Z0 =
number of the general connection channels G1: number of the inter-zone connection channels Z1

---

Therefore, the number of the general connection channel and the number of the inter-zone connection channel are calculated as follows.

---

Number of the inter-zone connection channels Z1 = number of operation channels × inter-zone connection traffic density Z0/
(general connection traffic density G0 + inter-zone connection traffic density Z0),
Number of the general connection channels G1 = number of operation channels − number of the inter-zone connection channels Z1

---

Figure 3:
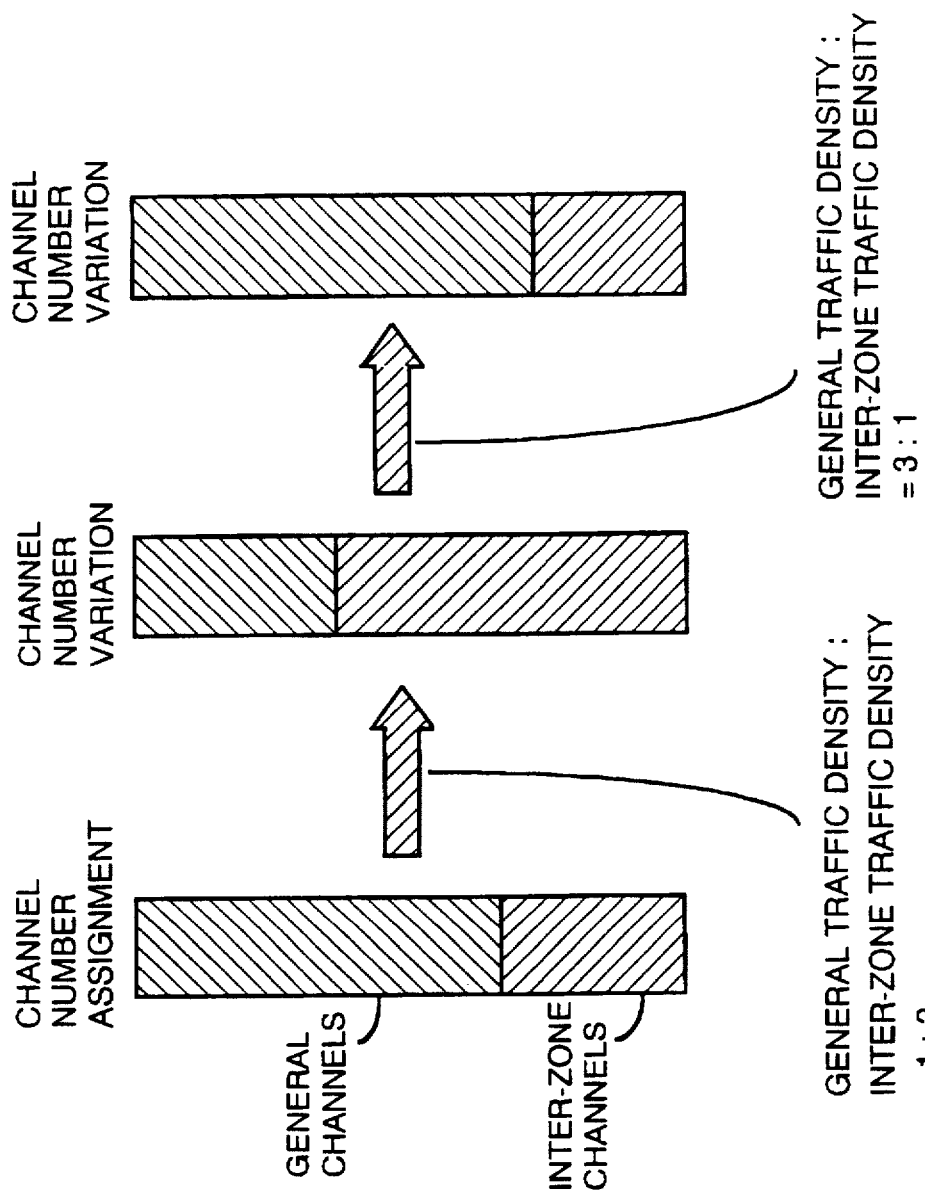
FIG. 3 shows variations of assignment ratio of operation channels in an inter-zone connection communication system according to the first embodiment of the present invention.

FIG. 3 shows variations of assignment ratio of the operating channel 35 in the inter-zone connection communication system of the first embodiment. In FIG. 3, the number of the general connection channels G1 and the number of the inter-zone connection channels Z1 are defined respectively according to the predetermined channel assignment ratio. If the ratio of the general connection traffic density G0 to the inter-zone connection traffic density Z0 varies to one to two, the line control units 18a and 28a change the ratio of the number of the general connection channels G1 to the number of the inter-zone connection channels Z1 to one to two, accordingly. After then, if the ratio of the general connection traffic density G0 to the inter-zone connection traffic density Z0 varies to three to one, the line control units 18a and 28a change the ratio of the number of the general connection channels G1 to the number of the inter-zone connection channels Z1 to three to one, accordingly.

According to the above mentioned construction of the inter-zone connection communication system, the line control units 18a and 28a carry out line control by changing the assignment ratio of the general connection stations 11 and 21 to the inter-zone connection stations 12 and 22 for the operation channels 35 and 45 comprised of a plurality of channels according to the traffic density of the general connection communication and the inter-zone connection communication, especially in this embodiment, according to respective assignment ratios of the general connection traffic density G0 to the inter-zone connection traffic density Z0. Accordingly, the number of channels increases at the connection communication side having a large traffic density, and thus the traffic processing capability of the system can be improved.

Embodiment 2

The inter-zone connection communication system using reservation cues in a second embodiment is explained below using figures. A determination system for assigning the general connection channels or the inter-zone connection channels in the operation channels 35 and 45 is explained by FIG. 4 and FIG. 5. Although the system construction is the same as that of FIGS. 1A, 1B, the line control units 18a and 28a operate differently from the system of FIGS. 1A, 1B.

Figure 4:
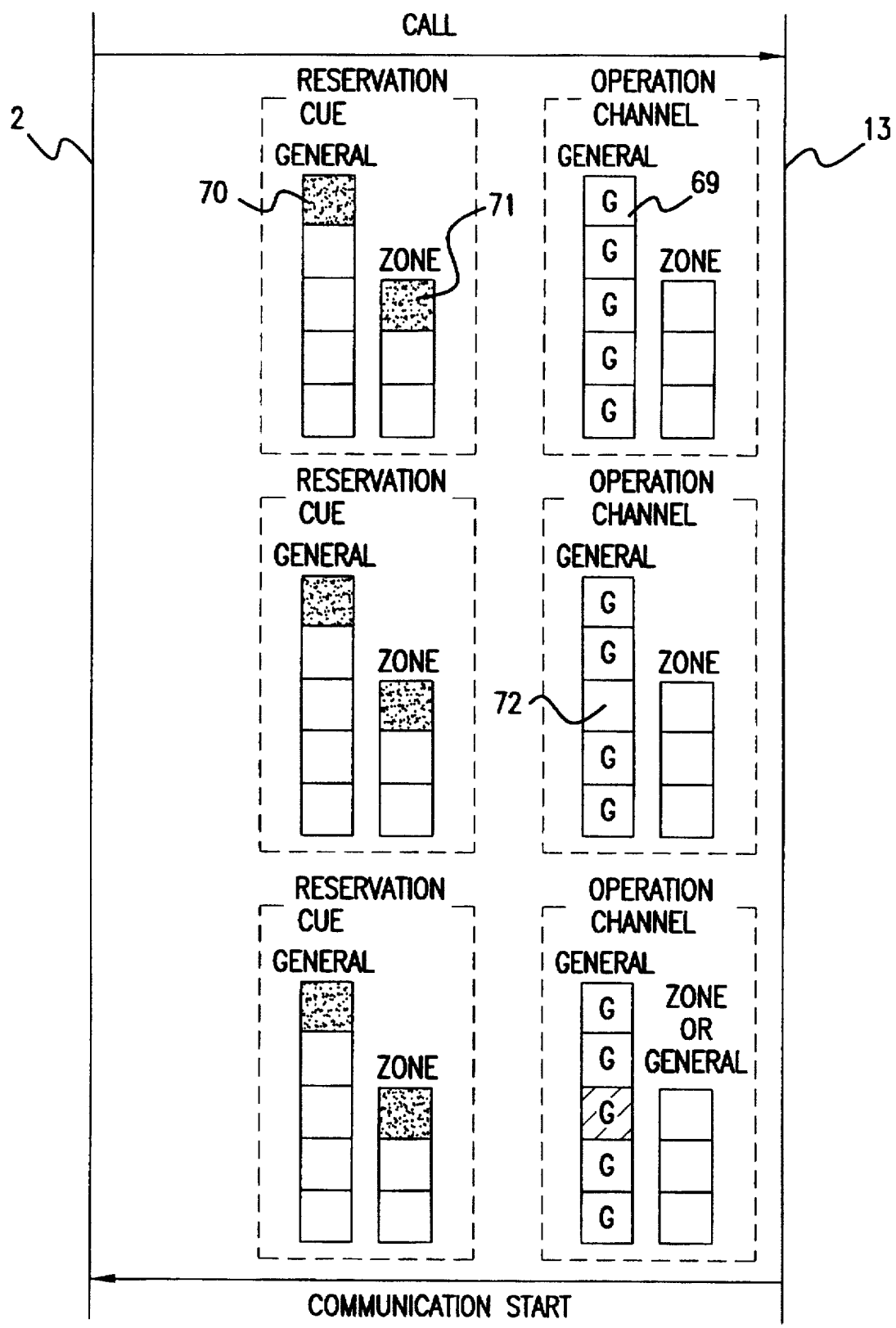
FIG. 4 shows a relation between reservation cues and operation channels in the inter-zone connection communication system according to a second embodiment of the present invention.

FIG. 4 shows a relation between the reservation cues and the operation channels in the inter-zone connection communication system of a second embodiment of the present invention. In FIG. 4, a mobile station 2 transmits a connection request signal (referred to as "call", hereafter) to a relay station 13. The relay station 13 receives the call from the mobile station 2 and reserves a general connection call at the head of the general connection reservation cue 70, since the general connection channel 69 is fully occupied (in FIG. 4, "G" means that the general connection is occupied). If an un-occupied portion is generated in the general connection channel 72 in its own zone, the relay station 13 assigns the general connection reservation 70 to the general connection channels. Then, the general connection communication is started, and the general connection reservation 70 is cleared. When the inter-zone connection channel is fully occupied, the calls are also reserved in the same way in the inter-zone connection reservation 71 and the operation of the zone channel communication is the same as that of the general connection communication. Therefore, the ratio of the general connection traffic density to the inter-zone connection traffic density varies according to the operation time zone from time to time, and thus the number of accumulated reservation also varies, accordingly.

Figure 5:
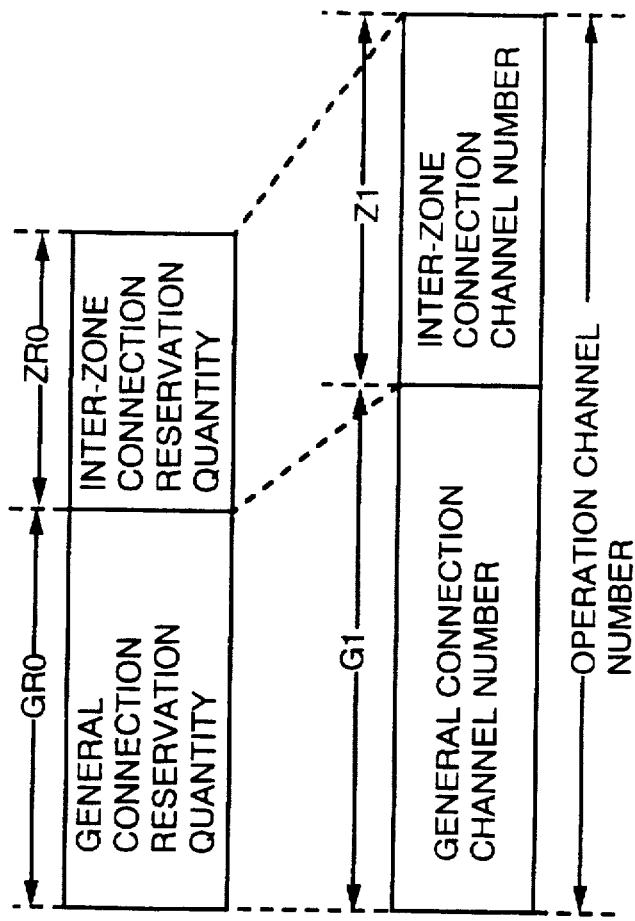
FIG. 5 shows an assignment condition of operation channels in the inter-zone connection communication system according to the second embodiment of the present invention.

FIG. 5 shows an assignment condition of operating channels in an inter-zone connection communication system of the second embodiment. In FIG. 5, the numeral GR0 denotes a general connection reservation quantity according to a plurality of the general connection mobile stations 11. The numeral ZR0 denotes an inter-zone connection reservation quantity according to a plurality of the inter-zone connection mobile stations 12. G1 denotes the number of the general connection channels to which the operation channel 35 is assigned. Z1 denotes the number of the inter-zone connection channels to which the operation channel 35 is assigned. The line control units 18a and 28a monitor the number of reservations generated inside their respective zones and change the number of the general connection channels G1 and the inter-zone connection channels Z1 according to a ratio of generated reservations.

The number of channels is set according to the following equation.

---

General connection reservation quantity GR0: inter-zone connection reservation quantity ZR0 =
number of the general connection channels G1: number of the inter-zone connection channels Z1

---

Therefore, the number of the general connection channels and the number of the inter-zone connection channels are calculated as follows.

---

Number of the inter-zone connection channels Z1 = number of operation channels × the inter-zone connection reservation quantity -continued ZR0/(the general connection reservation quantity GR0 + the inter-zone connection reservation quantity ZR0),
Number of the general connection channels G1 = number of operation channels − number of the inter-zone connection channels Z1

Figure 6:
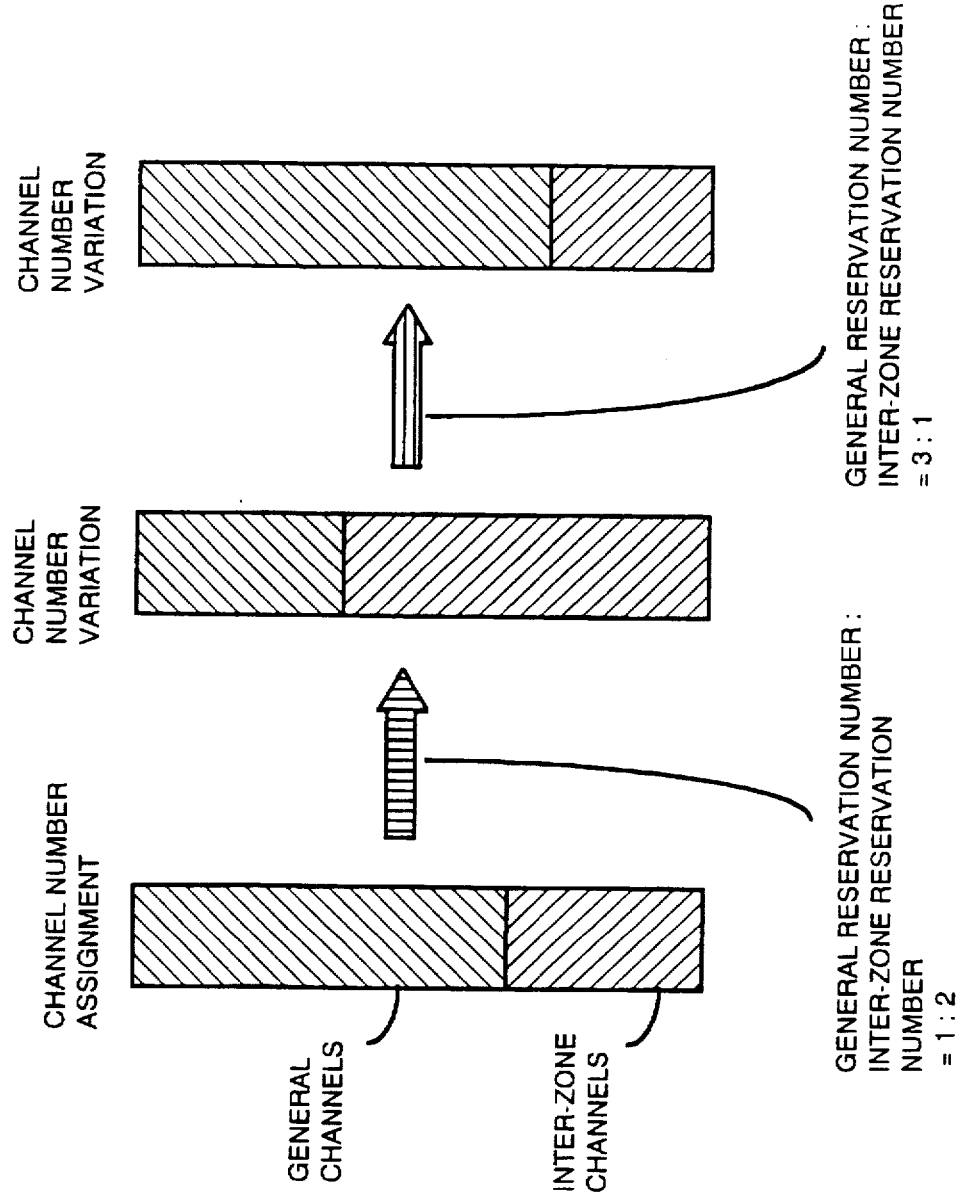
FIG. 6 shows variations of assignment ratio of operation channels in the inter-zone connection communication system according to the second embodiment of the present invention.

FIG. 6 shows variations of assignment ratio of the operating channels in the inter-zone connection communication system of the second embodiment. In FIG. 6, the number of the general connection channels and the number of the inter-zone connection channels are defined respectively according to the predetermined channel assignment ratio. If the ratio of the general connection reservation quantity GR0 to the inter-zone connection reservation quantity ZR0 varies to one to two, the line control units 18a and 28a change the ratio of the number of the general connection channels G1 to the number of the inter-zone connection channels Z1 to one to two accordingly. After then, if the ratio of the general connection reservation quantity GR0 to the inter-zone connection reservation quantity ZR0 varies to three to one, the line control units 18a and 28a changes the ratio of the number of the general connection channels G1 to the number of the inter-zone connection channels Z1 to three to one accordingly.

According to the above mentioned construction of the inter-zone connection communication system, the line control units 18a and 28a carry out line control by changing the assignment ratio of the general connection stations 11 and 21 to the inter-zone connection stations 12 and 22 for the operation channels 35 and 45 comprised of a plurality of channels according to the traffic density of the general connection communication and the inter-zone connection communication, especially in this embodiment, according to respective ratios of the general connection reservation quantity GR0 to the inter-zone connection reservation quantity ZR0. Accordingly, the number of channels increases at the connection communication side having a large traffic density, and thus the traffic processing capability of the system can be improved.

Embodiment 3

One example of the inter-zone communication system, which is responsible to channel congestion generated in either the general connection communication or the inter-zone connection communication, is explained below. The congestion state occurs when either the general connection communication or the inter-zone connection communication channels, and also the reservation cues are fully occupied. The line control units 18a and 28a assign more channels of the general connection and the inter-zone connection, respectively, to any one of the general connection communication or to the inter-zone connection communication where the congestion have occurred. Although the construction of the system of the third embodiment is the same as that of FIGS. 1A, 1B, the line control units 18a and 28a operate differently from that of FIGS. 1A, 1B.

Figure 7:
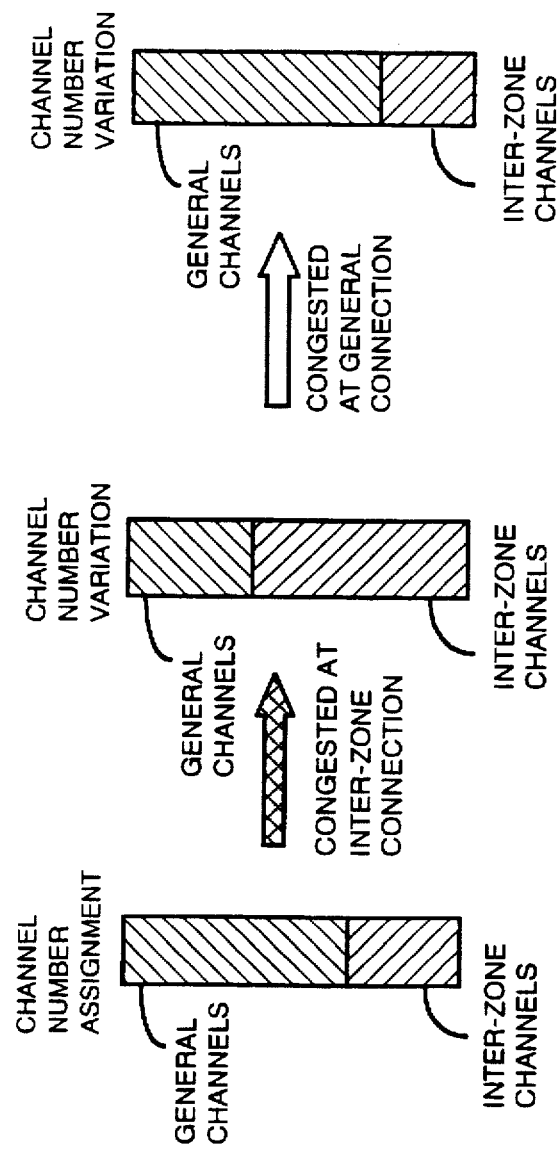
FIG. 7 shows variations of assignment ratio of operation channels in the inter-zone connection communication system according to a third embodiment of the present invention.

FIG. 7 shows variations of assignment ratio of operating channels in an inter-zone connection communication system of the third embodiment. In FIG. 7, the number of the general connection channels and the number of the inter-zone connection channels are respectively defined according to the predetermined channel assignment. If the inter-zone connection calls increase sharply to be in a congested condition, the line control units 18a and 28a increase the inter-zone connection channels more than the general connection channels. Then after, if the general connection calls increase sharply to be in a congested condition, the line control units 18a and 28a increase the general connection channels more than inter-zone connection channels.

According to the above mentioned construction of the inter-zone connection communication system, the line control units 18a and 28a carry out line control by changing the assignment ratio of the general connection stations 11 and 21 to the inter-zone connection stations 12 and 22 for the operation channels 35 and 45 comprised of a plurality of channels and by assigning more channels to either congested communication stations. Accordingly, the number of channels increases at the congested connection communication side having a large traffic density, and thus the traffic processing capability of the system can be improved.

Embodiment 4

An embodiment of an inter-zone communication system, which changes the number of the general connection reservation cues and the inter-zone connection reservation cues according to the traffic density of the general connection communication and the inter-zone connection communication, is explained below.

The ratio of the general connection traffic density to the inter-zone traffic density varies according to the operation time zone and so on. The line control units 18a and 28a change the number of the general connection reservation cues and the number of the inter-zone connection reservation cues according to the ratio of the general connection traffic density to the inter-zone connection traffic density generated in their own zones. Although the construction of the system of the fourth embodiment is the same as that of FIGS. 1A, 1B, the line control units 18a and 28a operate differently from that of FIGS. 1A, 1B.

Figure 8:
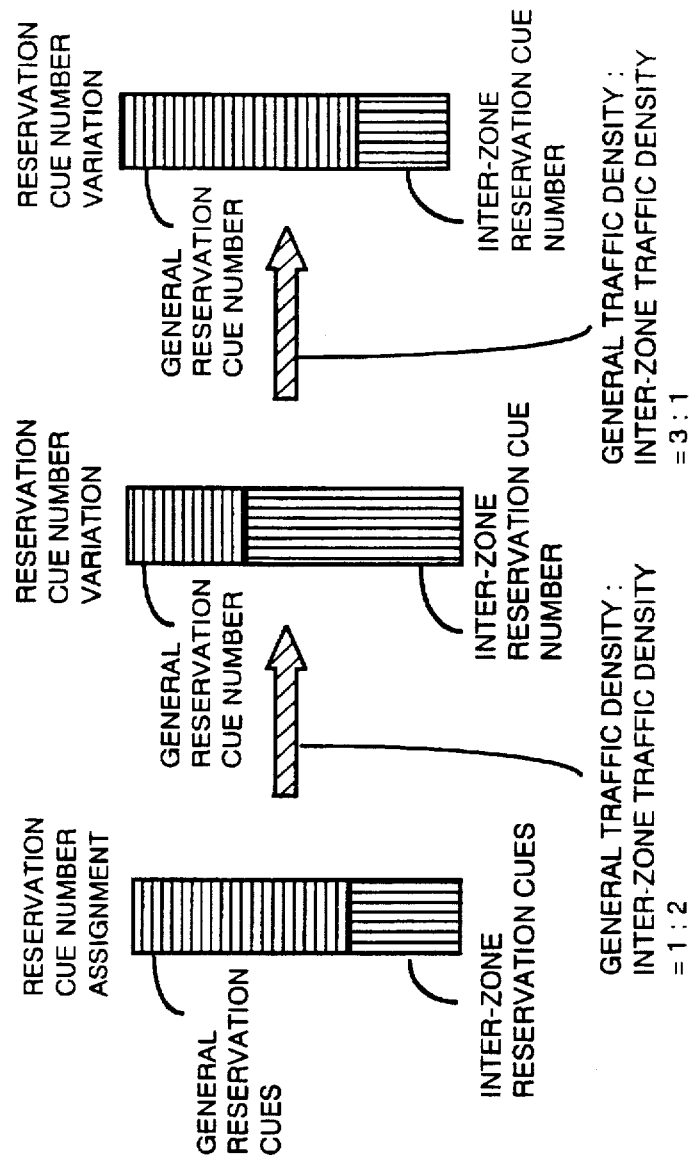
FIG. 8 shows variations of assignment ratio of reservation cues in the inter-zone connection communication system according to a fourth embodiment of the present invention.

FIG. 8 shows variations of assignment ratio of the reservation cues 36 and 46 in an inter-zone connection communication system of the fourth embodiment. In FIG. 8, the number of the general connection reservation cues and the number of the inter-zone connection reservation cues are defined respectively according to the predetermined reservation cue assignment. If the ratio of the general connection traffic density to the inter-zone connection traffic density varies to one to two, the line control units 18a and 28a change the ratio of the number of the general connection reservation cues to the number of the inter-zone connection reservation cues to one to two, accordingly. After then, if the ratio of the general connection traffic density to the inter-zone connection traffic density varies to three to one, the line control units 18a and 28a changes the ratio of the number of the general connection reservation cues to the number of the inter-zone connection reservation cues, accordingly.

According to the above mentioned construction of the inter-zone connection communication system, the line control units 18a and 28a carry out line control by changing the assignment ratio of the general connection reservation cues to the inter-zone connection reservation cues according to the ratio of the general connection communication traffic density to the inter-zone connection communication traffic density, especially in this embodiment, according to the assignment ratio of the general connection traffic density to the inter-zone connection traffic density. Accordingly, the number of reservation cues increases at the connection communication side having a large traffic density, and thus the traffic processing capability of the system can be improved.

Embodiment 5

An embodiment of an inter-zone communication system, which changes the number of reservation cues of the general connection reservation and the inter-zone connection reservation according to reservation quantity of the general connection communication and the inter-zone connection communication, is explained below. The ratio of the general connection traffic density to the inter-zone traffic density usually varies according to the operation time zone and so on, thereby accumulation quantity of reservation cues of the general connection communication and the inter-zone connection communication change. Although the construction of the system of the fifth embodiment is the same as that of FIGS. 1A, 1B, the line control units 18a and 28a operate differently from that of FIGS. 1A, 1B.

Figure 9:
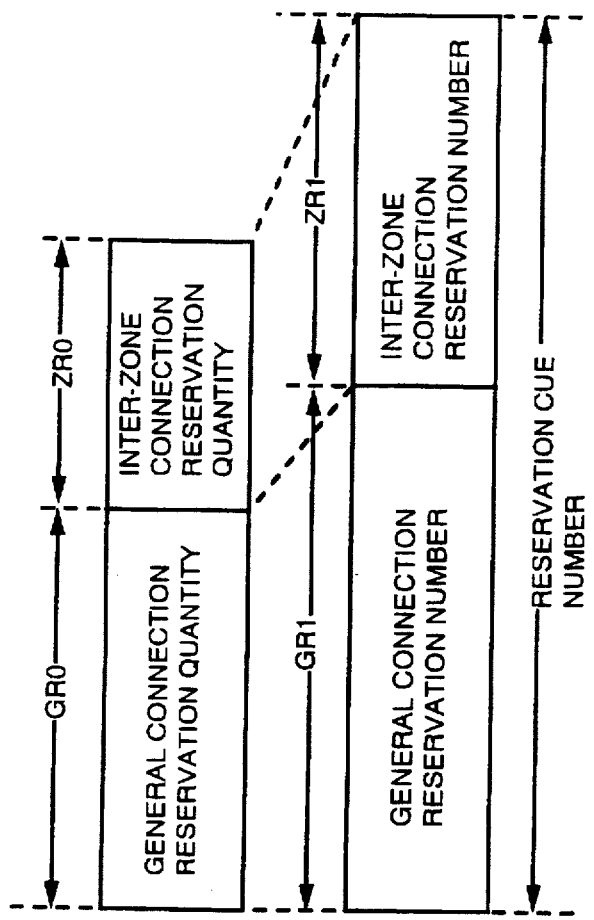
FIG. 9 shows an assignment condition of reservation cues in the inter-zone connection communication system according to a fifth embodiment of the present invention.

FIG. 9 shows an assignment condition of reservation cues in an inter-zone connection communication system of the fifth embodiment. In FIG. 9, the numeral GR0 denotes a general connection reservation quantity according to a plurality of the general connection mobile stations 11. The numeral ZR0 denotes an inter-zone connection reservation quantity according to a plurality of the inter-zone connection mobile stations 12. The numeral GR1 denotes the number of the general connection reservation cues to which the reservation cues 36 and 46 are assigned. The numeral ZR1 denotes the number of the inter-zone connection reservation cues to which the reservation cues 36 and 46 are assigned. The line control units 18a and 28a monitor the number of reservation cues of the general connection communication and the inter-zone connection communication generated in their own zones, and change the ratio of the number of the general connection reservation cues GR1 to the number of the inter-zone connection reservation cue ZR1 according to a ratio of generated reservation numbers.

The number of channels is set according to the following equation.

General connection reservation quantity GR0: inter-zone connection reservation quantity ZR0 =
number of the general connection reservation cues GR1: number of the inter-zone connection reservation cues ZR1.

Therefore, the number of the general connection channel and the number of the inter-zone connection channel are calculated as follows.

Number of the inter-zone connection reservation cues ZR1 = whole sum of reservation cues × inter-zone connection reservation quantity ZR0/(general connection reservation quantity GR0 + inter-zone connection reservation quantity ZR0),
Number of the general connection reservation cues GR1 = whole sum of reservation cues − number of the inter-zone connection reservation cues ZR1.

Figure 10:
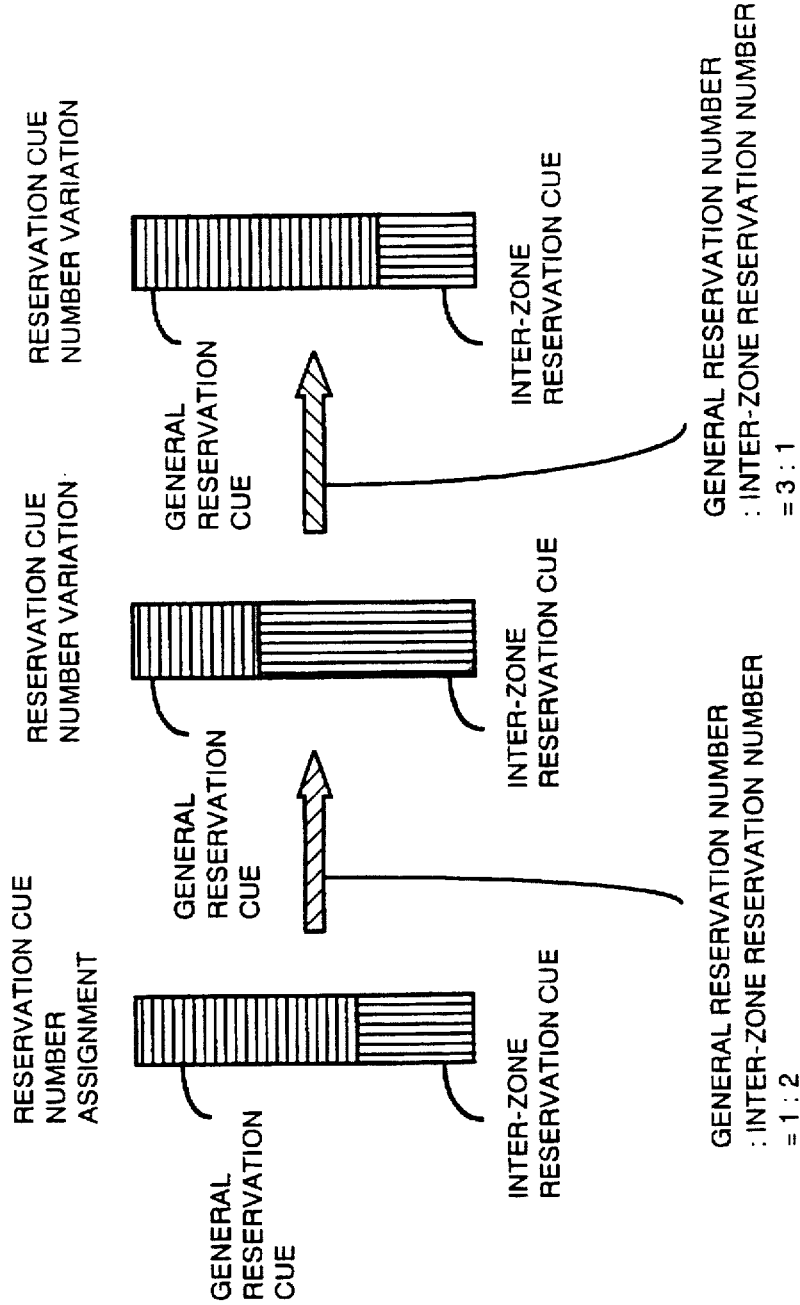
FIG. 10 shows variations of assignment ratio of reservation cues in the inter-zone connection communication system according to the fifth embodiment of the present invention.

FIG. 10 shows variations of assignment ratio of reservation cues in an inter-zone connection communication system of the fifth embodiment. The number of the general connection reservation cues GR1 and the number of the inter-zone connection reservation cues ZR1 are defined respectively according to the predetermined reservation cue assignment. After then, if the ratio of the general connection reservation quantity GR0 to the inter-zone connection reservation quantity ZR0 varies to one to two, the line control units 18a and 28a change the ratio of the number of the general connection reservation cues GR1 to the number of the inter-zone connection reservation cues ZR1 to one to two. After then, if the ratio of the general connection reservation quantity GR0 to the inter-zone connection reservation quantity ZR0 varies to three to one, the line control units 18a and 28a change the ratio of the number of the general connection reservation cues GR1 to the number of the inter-zone connection reservation cues ZR1 to three to one, accordingly.

According to the above mentioned construction of the inter-zone connection communication system, the line control units 18a and 28a carry out line control by changing the assignment ratio of the general connection communication to the inter-zone connection communication of the reservation cues 36 and 46 according to the ratio of the general connection communication traffic density to the inter-zone connection communication traffic density, especially in this embodiment, according to the assignment ratio of the general connection reservation quantity GR1 to the inter-zone connection reservation quantity ZR1. Accordingly, the number of reservation cues increases at the connection communication side having a large traffic density, and thus the traffic processing capability of the system can be improved.

Embodiment 6

Other example of the inter-zone communication system, which is responsible to congestion of reservation cues generated in either the general connection communication or the inter-zone connection communication, is explained below. The congestion state occurs when either the general connection communication or the inter-zone connection communication channels, and also the reservation cues are fully occupied. The line control units 18a and 28a assign the general connection reservation cues and the inter-zone connection cues to any one of the general connection communication or to the inter-zone connection communication where the congestion have occurred. Although the construction of the system of the sixth embodiment is the same as that of FIGS. 1A, 1B, the line control units 18a and 28a operate differently from that of FIGS. 1A, 1B.

Figure 11:
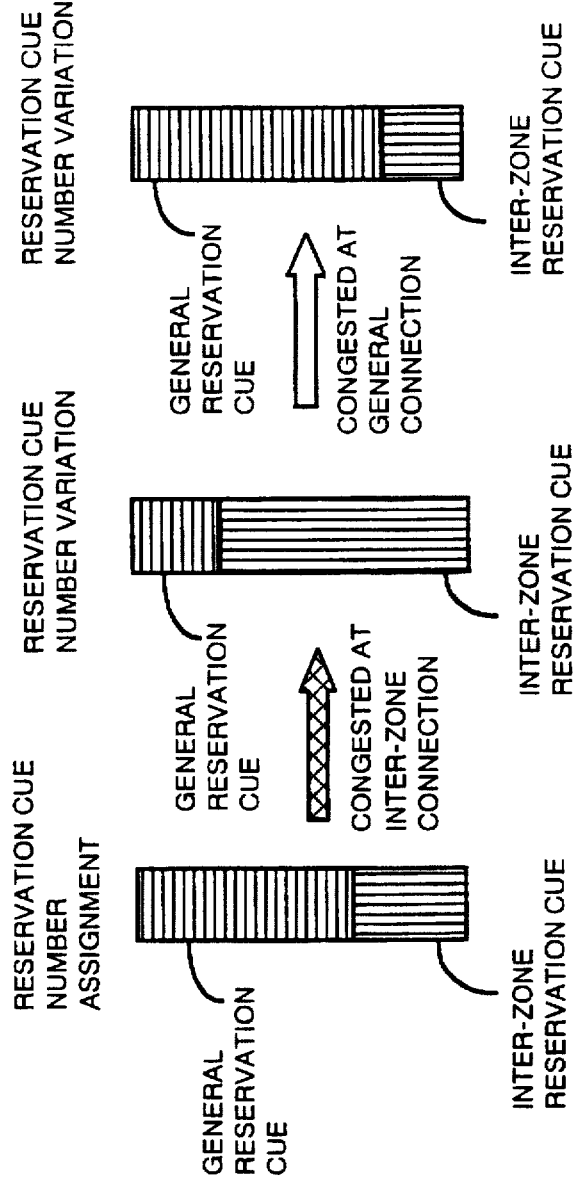
FIG. 11 shows variations of assignment ratios of reservation cues in the inter-zone connection communication system according to a sixth embodiment of the present invention.

FIG. 11 shows variations of assignment ratio of reservation cues in an inter-zone connection communication system of the sixth embodiment. In FIG. 11, the number of the general connection reservation cues and the number of the inter-zone connection reservation cues are defined respectively according to the predetermined reservation cue assignment. If the inter-zone connection calls increase sharply to be in a congested condition for the reservation cues, the line control units 18a and 28a increase the inter-zone connection reservation cues more than the general connection reservation cues. Then after, if the general connection calls increase sharply to be in a congested condition, the line control units 18a and 28a increase the general connection reservation cues more than the inter-zone connection reservation cues.

According to the above mentioned construction of the inter-zone connection communication system, the line control units 18a and 28a carry out line control by changing the assignment ratio of the general connection stations to the inter-zone connection stations for the reservation cues 36 and 46 to either congested communication side. Accordingly, the number of reservation cues increases at the congested connection communication side, and thus the traffic processing capability of the system can be improved.

Embodiment 7

A seventh embodiment of an inter-zone communication system, which changes the assignment ratio of operation channels together with the assignment ratio of reservation cues according to the traffic density of the general connection communication and the inter-zone connection communication, is explained below.

In general, the ratio of the general connection traffic density to the inter-zone traffic density varies according to the operation time zone and so on, and an occupied state of the connection channels and an accumulation quantity of the reservation cues varies, accordingly. The line control units 18a and 28a change the ratio of the general connection channels to the inter-zone connection channels together with the ratio of the general connection reservation cues to the inter-zone connection reservation cues according to respective generated traffic quantities. Although the construction of the system of the seventh embodiment is the same as that of FIGS. 1A, 1B, the line control units 18a and 28a operate differently from that of FIGS. 1A, 1B.

Figure 12:
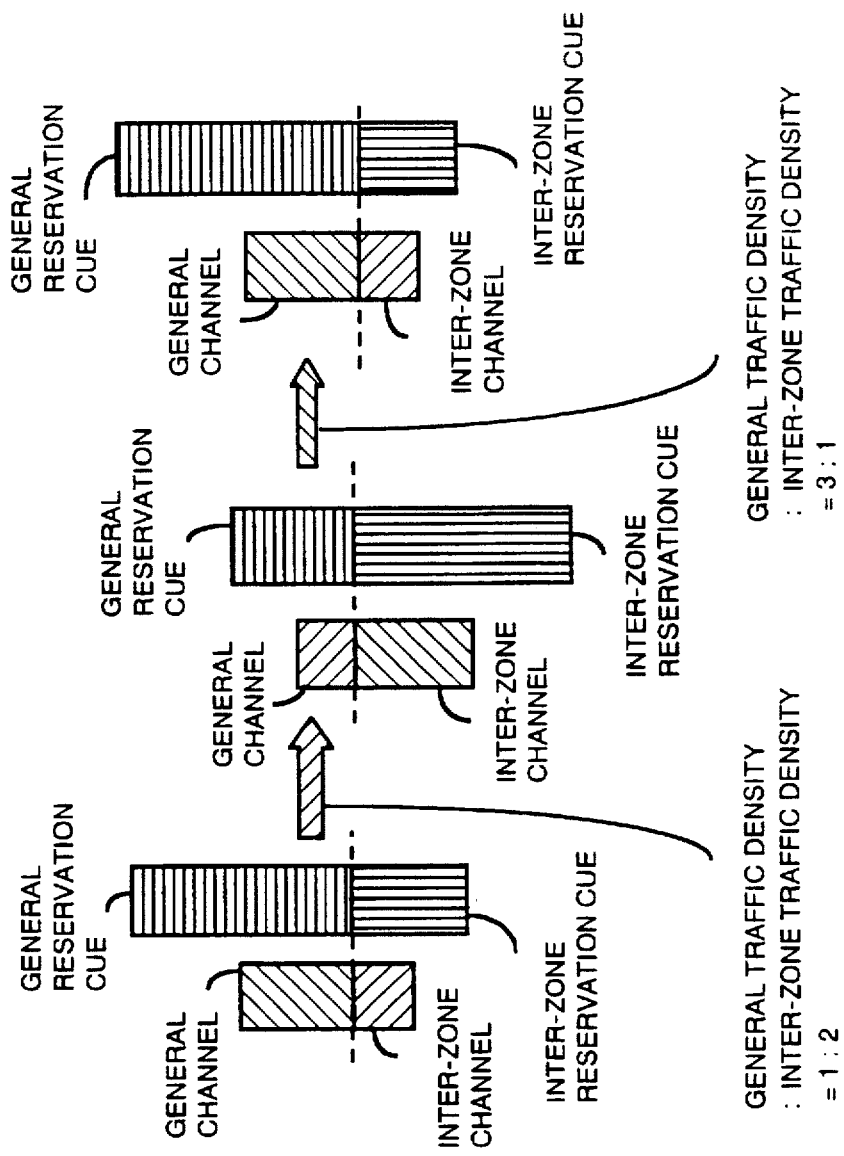
FIG. 12 shows variations of assignment ratios of operation channels and reservation cues in the inter-zone connection communication system according to a seventh embodiment of the present invention.

FIG. 12 shows variations of assignment ratio of operation channels and reservation cues in the inter-zone connection communication system of the seventh embodiment. In FIG. 12, the number of the general connection channels and the inter-zone connection channels and the number of the general connection reservation cues and the inter-zone connection reservation cues are assigned respectively by the predetermined same ratios. After then, if the ratio of the general connection traffic density to the inter-zone connection traffic density varies to one to two, the line control units 18a and 28a changes the above mentioned predetermined ratio to one to two accordingly. After then, if the ratio of the general connection traffic density to the inter-zone connection traffic density varies to three to one, the line control units 18a and 28a changes the above mentioned predetermined ratio to three to one.

According the above mentioned construction of the inter-zone connection communication system, the line control units 18a and 28a carry out line control in order to change an assignment ratio of the operation channels 35 and 45 together with an assignment ratio of the reservation cues 36 and 46 according to the traffic density of the general connection communication and the inter-zone connection communication. Accordingly, the number of the channel and the number of the reservation cues increase at the connection communication side having a large traffic density, and thus the traffic processing capability of the system can be improved.

Embodiment 8

An eighth embodiment of an inter-zone communication system, which changes the assignment ratio of operation channels together with the assignment ratio of reservation cues according to the ratio of the reservation quantity of the general connection communication, to the inter-zone connection communication, is explained below. In general, the ratio of the general connection traffic density to inter-zone traffic density varies according to the operation time zone and so on, and occupied state of the connection channels and an accumulation quantity of the reservation cues varies, accordingly.

The line control units 18a and 28a monitor the ratio of the general connection reservation quantity to the inter-zone connection reservation quantity in its own zone, and change the ratio of the general connection channels to the inter-zone connection channels together with the ratio of the general connection reservation cues to the inter-zone connection reservation cues, according to the respective generated reservation ratios. Although the construction of the system of the eighth embodiment is the same as that of FIGS. 1A, 1B, the line control units 18a and 28a operate differently from that of FIGS. 1A, 1B.

Figure 13:
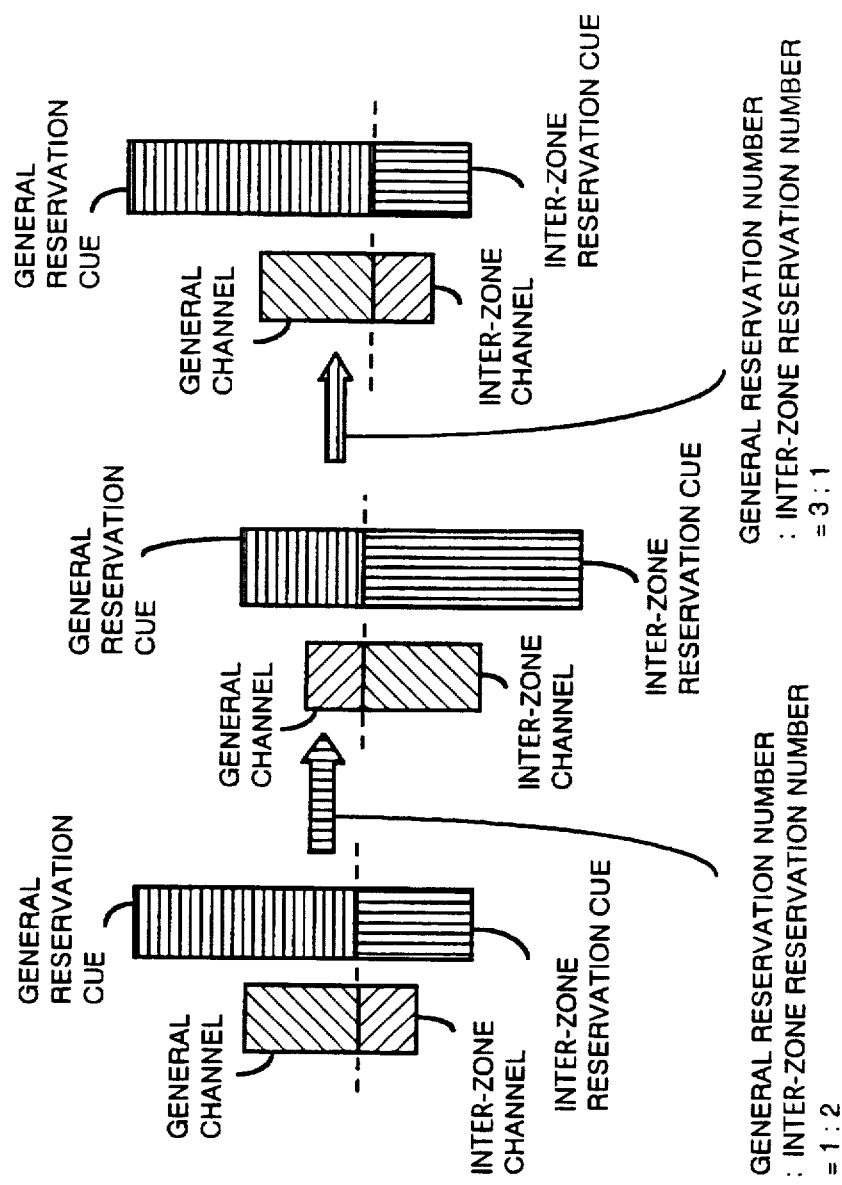
FIG. 13 shows variations of assignment ratios of operation channels and reservation cues in the inter-zone connection communication system according to an eighth embodiment of the present invention.

FIG. 13 shows variations of assignment ratio of operation channels and reservation cues in the inter-zone connection communication system of the eighth embodiment. In FIG. 13, the number of the general connection channels and the inter-zone connection channels and the number of the general connection reservation cues and the inter-zone connection reservation cues are assigned respectively by the predetermined same ratios. After then, if the ratio of the general connection reservation quantity to the inter-zone connection reservation quantity varies to one to two, the line control units 18a and 28a changes the above mentioned predetermined ratio to one to two, accordingly. After then, if the ratio of the general connection reservation quantity to the inter-zone connection reservation quantity varies to three to one, the line control units 18a and 28a changes the above mentioned predetermined ratio to three to one.

According the above mentioned construction of the inter-zone connection communication system, the line control units 18a and 28a carry out line control in order to change an assignment ratio of the operation channels 35 and 45 together with an assignment ratio of the reservation cues 36 and 46 according to the traffic density of the general connection communication and the inter-zone connection communication, especially according to a ratio of the reservation quantity in this embodiment. Accordingly, the number of the channel and the number of the reservation cues increase at the connection communication side having a large traffic density, and thus the traffic processing capability of the system can be improved.

Embodiment 9

Other example of the inter-zone communication system, which is responsible to channel congestion generated in either the general connection communication or the inter-zone connection communication, is explained below. The congestion state occurs when either the general connection communication or the inter-zone connection communication channels, and also the reservation cues are fully occupied. The line control units 18a and 28a assign more channels of the general connection and inter-zone connection, and more general and inter-zone connection reservation cues, respectively, to any one of the general connection communication or the inter-zone connection communication where the congestion have occurred. Although the construction of the system of the ninth embodiment is the same as that of FIGS. 1A, 1B, the line control units 18a and 28a operate differently from that of FIGS. 1A, 1B.

Figure 14:
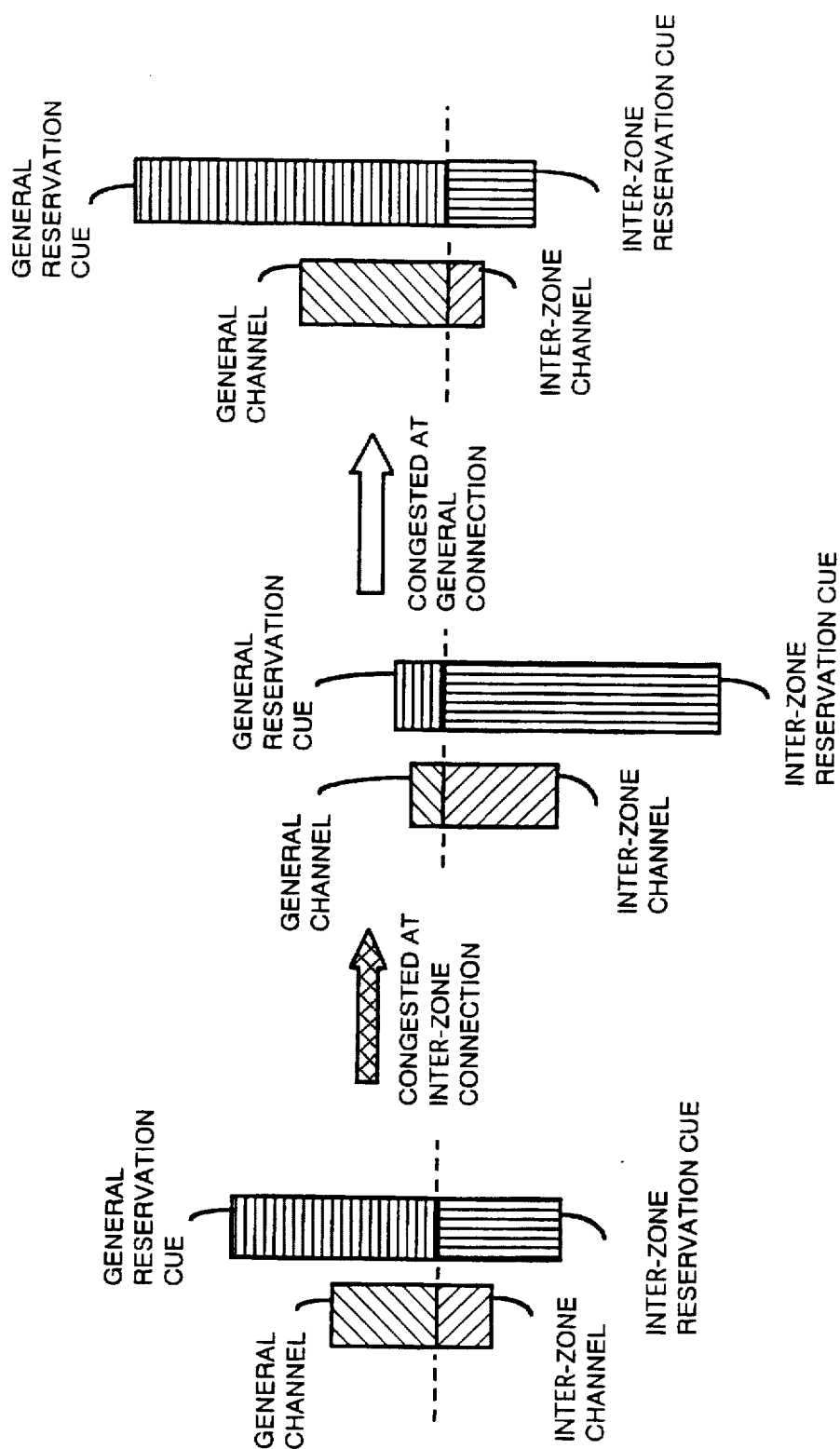
FIG. 14 shows variations of assignment ratios of operation channels and reservation cues in the inter-zone connection communication system according to a ninth embodiment of the present invention.

FIG. 14 shows variations of assignment ratios of operation channels and reservation cues in an inter-zone connection communication system of the ninth embodiment. In FIG. 14, the number of the general connection channels and the inter-zone connection channels and also the number of the general connection reservation cues and the inter-zone connection reservation cues are defined respectively according to the predetermined same ratios. If the inter-zone connection calls increase sharply to be in a congested condition, the line control units 18a and 28a increase the inter-zone connection channels and the inter-zone connection reservation cues more than the general connection channels and the general connection reservation cues, respectively. Then after, if the general connection calls increase sharply to be in a congested condition, the line control units 18a and 28a increase the general connection channels and the general connection reservation cues more than the inter-zone connection channels and the inter-zone connection reservation cues, respectively.

According to the above mentioned construction of the inter-zone connection communication system, the line control units 18a and 28a assign more operation channels 35 and 45 and more reservation cues 36 and 46 to either of the congested general connection communication side or the congested inter-zone connection communication side. Accordingly, the number of channels and the number of reservation cues increase at the congested connection communication side having a large traffic density, and thus the traffic processing capability of the system can be improved.

In the above mentioned respective embodiments, the traffic density and the reservation quantity are used as the traffic density of each communication which determines an assignment ratio of the operation channels or the reservation cues. However, other quantities, for example, a sum of the traffic density and the reservation quantity, a congestion generation rate, and call regulation time which regulates the generated calls when the congestion occurs, could be used as the traffic density if it could show a congestion index of the communication. In the above mentioned respective embodiments, a connection station is explained as a mobile station. However, a connection station could also be a fixed station.

What is claimed is:

1. An inter-zone connection communication method for carrying out general connection communication and inter-zone communication at the same time by using common communication channels which are selectively assigned for use as general connection channels for general connection communication between connection stations in a radio communication area of one relay station, and as inter-zone connection channels which are used for inter-zone connection communication between a first connection station in a radio communication area of one relay station and a second connection station in a radio communication area of another relay station, comprising the step of:

carrying out line control by changing an assignment ratio of said general connection channels to said inter-zone connection channels according to respective traffic quantities of said general connection communication and said inter-zone connection communication.

2. The inter-zone connection communication method of claim 1, wherein said respective traffic quantities are traffic densities of the general connection communication and the inter-zone connection communication, respectively.

3. The inter-zone connection communication method of claim 1, wherein said respective traffic quantities are reservation quantities of the general connection communication and the inter-zone connection communication, respectively.

4. The inter-zone connection communication method of claim 1, wherein more channels of said general connection channels or said inter-zone connection channels are assigned to a communication area where congestion has occurred between said general connection communication and said inter-zone connection communication.

5. An inter-zone connection communication method for carrying out general connection communication and inter-zone communication at the same time by using common communication channels which are selectively assigned for use as general connection channels for general connection communication between connection stations in a radio communication area of one relay station, and as inter-zone connection channels which are used for inter-zone connection communication between a first connection station in a radio communication area of one relay station and a second connection station in a radio communication area of another relay station, comprising the step of:

carrying out line control by changing an assignment ratio of general connection reservation cues for storing reservations when said general connection channels are fully occupied, to inter-zone connection reservation cues for storing reservations when said inter-zone connection channels are fully occupied, according to respective traffic quantities of said general connection communication and said inter-zone connection communication.

6. The inter-zone connection communication method of claim 5, wherein said respective traffic quantities are traffic densities of the general connection communication and the inter-zone connection communication, respectively.

7. The inter-zone connection communication method of claim 5, wherein said respective traffic quantities are reservation quantities of the general connection communication and the inter-zone connection communication, respectively.

8. The inter-zone connection communication method of claim 5, wherein more channels of said general connection reservation cues or said inter-zone connection reservation cues are assigned to a communication area where congestion has occurred in any of said general connection communication and said inter-zone connection communication.

9. An inter-zone connection communication method for carrying out general connection communication and inter-zone communication at the same time by using common communication channels which are selectively assigned for use as general connection channels for general connection communication between connection stations in a radio communication area of one relay station, and as inter-zone connection channels which are used for inter-zone connection communication between a first connection station in a radio communication area of one relay station and a second connection station in a radio communication area of another relay station, comprising the steps of:

using general connection reservation cues for storing reservations when said general connection channels are fully occupied, and using inter-zone connection reservation cues for storing reservations when said inter-zone connection channels are fully occupied, and changing an assignment ratio of the general connection reservation cues to the inter-zone connection reservation cues, and an assignment ratio of the general connection channels to the inter-zone connection channels at the same time, according to respective traffic quantities of said general connection communication and said inter-zone connection communication.

10. The inter-zone connection communication method of claim 9, wherein said respective traffic quantities are traffic densities of the general connection communication and the inter-zone connection communication, respectively.

11. The inter-zone connection communication method of claim 9, wherein said respective traffic quantities are reservation quantities of the general connection communication and the inter-zone connection communication, respectively.

12. The inter-zone connection communication method of claim 9, wherein more channels of said general connection channels or said inter-zone connection channels, and more channels of said general connection reservation cues or said inter-zone connection reservation cues are assigned to a communication area where congestion has occurred in any of said general connection communication and said inter-zone connection communication.

13. An inter-zone connection communication system for carrying out general connection communication and inter-zone communication at the same time, comprising general connection channels which are used for general connection communication between connection stations in a radio communication area of one relay station, and also comprising inter-zone connection channels which are used for inter-zone connection communication between a first connection station in a radio communication area of one relay station and a second connection station in a radio communication area of another relay station, comprising:

a line control circuit for carrying out line control by changing an assignment ratio of said general connection channels to said inter-zone connection channels according to respective traffic quantities of said general connection communication and said inter-zone connection communication.

14. The inter-zone connection communication system of claim 13, wherein said respective traffic quantities are traffic densities of the general connection communication and the inter-zone connection communication, respectively.

15. The inter-zone connection communication system of claim 13, wherein said respective traffic quantities are reservation quantities of the general connection communication and the inter-zone connection communication, respectively.

16. The inter-zone connection communication system of claim 13, wherein said line control circuit assigns more channels of said general connection channels or said inter-zone connection channels to a communication area where congestion has occurred between said general connection communication and said inter-zone connection communication.

17. An inter-zone connection communication system for carrying out general connection communication and inter-zone communication at the same time, comprising general connection channels which are used for general connection communication between connection stations in a radio communication area of one relay station, and also comprising inter-zone connection channels which are used for inter-zone connection communication between a first connection station in a radio communication area of one relay station and a second connection station in a radio communication area of another relay station, comprising:

a line control circuit for carrying out line control by changing an assignment ratio of general connection reservation cues for storing reservations when said general connection channels are fully occupied, to inter-zone connection reservation cues for storing reservations when said inter-zone connection channels are fully occupied, according to respective traffic quantities of said general connection communication and said inter-zone connection communication.

18. The inter-zone connection communication system of claim 17, wherein said respective traffic quantities are traffic densities of the general connection communication and the inter-zone connection communication, respectively.

19. The inter-zone connection communication system of claim 17, wherein said respective traffic quantities are reservation quantities of the general connection communication and the inter-zone connection communication, respectively.

20. The inter-zone connection communication system of claim 17, wherein said line control circuit assigns more channels of said general connection reservation cues or said inter-zone connection reservation cues to a communication area where congestion has occurred in any of said general connection communication and said inter-zone connection communication.

21. An inter-zone connection communication system for carrying out general connection communication and inter-zone communication at the same time, comprising general connection channels which are used for general connection communication between connection stations in a radio communication area of one relay station, and also comprising inter-zone connection channels which are used for inter-zone connection communication between a first connection station in a radio communication area of one relay station and a second connection station in a radio communication area of another relay station, comprising:

general connection reservation cues for storing reservations when said general connection channels are fully occupied, and inter-zone connection reservation cues for storing reservations when said inter-zone connection channels are fully occupied, and a line control circuit for carrying out line control by changing an assignment ratio of the general connection reservation cues to the inter-zone connection reservation cues, and an assignment ratio of the general connection channels to the inter-zone connection channels according to respective traffic quantities of said general connection communication and said inter-zone connection communication.

22. The inter-zone connection communication system of claim 21, wherein said respective traffic quantities are traffic densities of the general connection communication and the inter-zone connection communication, respectively.

23. The inter-zone connection communication system of claim 21, wherein said respective traffic quantities are reservation quantities of the general connection communication and the inter-zone connection communication, respectively.

24. The inter-zone connection communication system of claim 21, wherein said line control channel assigns more channels of said general connection channels or said inter-zone connection channels, and more channels of said general connection reservation cues or said inter-zone connection reservation cues to a communication area where congestion has occurred in any of said general connection communication and said inter-zone connection communication.

\* \* \* \* \*